(12) United States Patent
Antonis

(10) Patent No.: US 12,340,502 B2
(45) Date of Patent: Jun. 24, 2025

(54) PROJECTOR ASSEMBLY SYSTEM AND METHOD

(71) Applicant: InspecVision Limited, Mallusk (GB)

(72) Inventor: Jan Antonis, Mallusk (GB)

(73) Assignee: InspecVision Limited, Mallusk (GB)

( * ) Notice: Subject to any disclaimer, the term of this patent is extended or adjusted under 35 U.S.C. 154(b) by 424 days.

(21) Appl. No.: 17/615,699

(22) PCT Filed: Jun. 2, 2020

(86) PCT No.: PCT/EP2020/065239
§ 371 (c)(1),
(2) Date: Dec. 1, 2021

(87) PCT Pub. No.: WO2020/245130
PCT Pub. Date: Dec. 10, 2020

(65) Prior Publication Data
US 2022/0237762 A1   Jul. 28, 2022

(30) Foreign Application Priority Data
Jun. 3, 2019   (GB) ...................................... 1907824

(51) Int. Cl.
*G06T 7/00* (2017.01)
*G09G 3/00* (2006.01)

(52) U.S. Cl.
CPC ............. *G06T 7/001* (2013.01); *G09G 3/002* (2013.01); *G06T 2207/20081* (2013.01); *G06T 2207/20224* (2013.01); *G06T 2207/30164* (2013.01)

(58) Field of Classification Search
None
See application file for complete search history.

(56) References Cited

U.S. PATENT DOCUMENTS

| 8,437,535 B2 * | 5/2013 | Boca ..................... G01S 17/875 |
| | | 382/154 |
| 2003/0107736 A1 * | 6/2003 | Fujimoto .................. G06T 7/32 |
| | | 356/394 |

(Continued)

FOREIGN PATENT DOCUMENTS

| EP | 3154261 A1 | 4/2017 |
| EP | 3434411 A1 | 1/2019 |

(Continued)

OTHER PUBLICATIONS

International Search Report and Written Opinion pertaining to PCT/EP2020/065239, dated Jul. 24, 2020.

(Continued)

*Primary Examiner* — Soo Shin
(74) *Attorney, Agent, or Firm* — GRUMBLES LAW PLLC; Brittany Haanan

(57) ABSTRACT

A method of assembling a plurality of objects comprises: creating a pixel map of a current scene in a work zone by mapping pixels of a camera to pixels of a projector; comparing the current scene pixel map with a corresponding previous scene pixel map; creating a projector pixel set depending on the differences between the current scene pixel map and the previous scene pixel map; and causing the projector to illuminate the work zone using the projector pixel set. The method may include a training mode in which the correct assembly steps are learned, a guidance mode in which a user is guided through the assembly steps, and a verification mode in which the actual assembly steps are verified.

12 Claims, 9 Drawing Sheets

(56) References Cited

U.S. PATENT DOCUMENTS

| | | | |
|---|---|---|---|
| 2004/0256541 A1* | 12/2004 | Cofer | G08B 13/19686 250/221 |
| 2007/0046924 A1* | 3/2007 | Chang | G01C 7/00 356/3.01 |
| 2011/0129140 A1* | 6/2011 | Kitazawa | G06T 7/001 382/149 |
| 2012/0062725 A1* | 3/2012 | Wampler, II | G01V 8/12 348/86 |
| 2016/0094830 A1* | 3/2016 | Taubin | G06T 7/521 348/46 |
| 2017/0178354 A1* | 6/2017 | Wendler | G06T 7/85 |
| 2019/0325593 A1* | 10/2019 | Tokimitsu | G01B 11/25 |
| 2021/0358110 A1* | 11/2021 | Bücher | G06T 7/0004 |
| 2024/0003675 A1* | 1/2024 | Fu | G06T 7/70 |

FOREIGN PATENT DOCUMENTS

| | | | |
|---|---|---|---|
| JP | 2010034720 A | 2/2010 | |
| WO | 2016126489 A1 | 8/2016 | |

OTHER PUBLICATIONS

Search Report for corresponding United Kingdom Patent Application No. (GB)1907824.5, search completed Nov. 4, 2019.

* cited by examiner

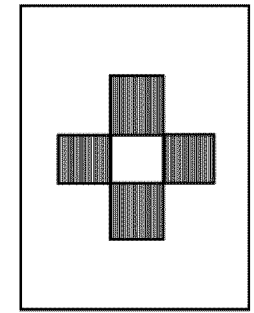
FIG. 6D
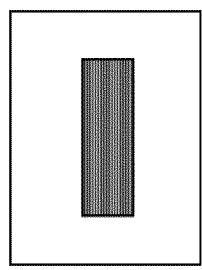
FIG. 5B
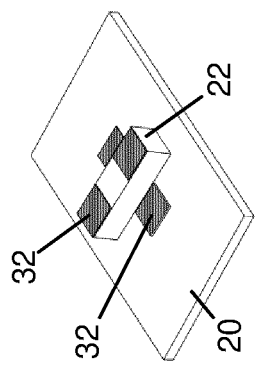
FIG. 6C
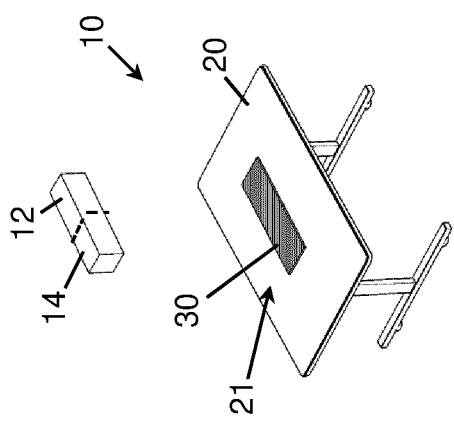
FIG. 5A
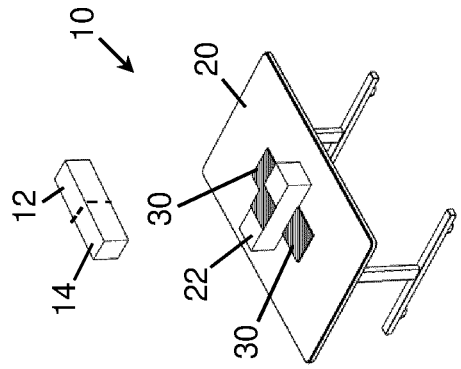
FIG. 6B
FIG. 6A

| Camera x,y | 0 | 1 | 2 | 3 | 4 |
|---|---|---|---|---|---|
| 0 | P0,0 | P1,0 | P2,0 | P3,0 | P4,0 |
| 1 | P0,1 | P1,1 | P2,1 | P3,1 | P4,1 |
| 2 | P0,2 | P1,2 | P2,2 | P3,2 | P4,2 |
| 3 | P0,3 | P1,3 | P2,3 | P3,3 | P4,3 |
| 4 | P0,4 | P1,4 | P2,4 | P3,4 | P4,4 |

FIG. 12A

| Camera x,y | 0 | 1 | 2 | 3 | 4 |
|---|---|---|---|---|---|
| 0 | P0,0 | P1,0 | P2,0 | P3,0 | P4,0 |
| 1 | P0,1 | P3,1 | P4,1 | P5,1 | P4,1 |
| 2 | P0,2 | P3,2 | P4,2 | P5,2 | P4,2 |
| 3 | P0,3 | P3,3 | P4,3 | P5,3 | P4,3 |
| 4 | P0,4 | P1,4 | P2,4 | P3,4 | P4,4 |

FIG. 12B

| Camera x,y | 0 | 1 | 2 | 3 | 4 |
|---|---|---|---|---|---|
| 0 | d0,0 | d0,0 | d0,0 | d0,0 | d0,0 |
| 1 | d0,0 | d2,0 | d2,0 | d2,0 | d0,0 |
| 2 | d0,0 | d2,0 | d2,0 | d2,0 | d0,0 |
| 3 | d0,0 | d0,0 | d0,0 | d2,0 | d0,0 |
| 4 | d0,0 | d0,0 | d0,0 | d0,0 | d0,0 |

FIG. 12C

PROJECTOR ASSEMBLY SYSTEM AND METHOD

FIELD OF THE INVENTION

This invention relates to projector assembly systems and methods.

BACKGROUND TO THE INVENTION

Laser projectors are commonly used in manufacturing processes to assist in assembly of composite articles across various industries. Known laser projectors use a scanned laser beam to generate light templates on a 3D object surface using computer assisted design (CAD) data for projection trajectories. Typically laser projectors include optical feedback for defining the projector's location and orientation in 3D space with respect to the object's coordinate system. This requires use of multiple fiducial markers on the object. Once all the fiducial points are detected, the position and orientation of the laser projector is determined with respect to the object. Then the projector projects light templates onto the object to assist in the positioning of parts in production assembly processes.

Placing fiducial markers onto the object is time and labour consuming, and can degrade reliability due to a lack of precision. Object features, such as corners and apertures, may be used as fiducial points but also this tends to result in a lack of precision. Furthermore, conventional laser projector systems tend to be relatively complex and expensive. Also, this approach requires either a good CAD model of the part and manual programming to define each manual operation, or a good CAD model of the part at each stage of assembly, both of which are time consuming and costly to obtain. A further limitation of this approach is that it does not include any verification of each manual operation.

It would be desirable to provide a projector assembly system and method that mitigates the problems outlined above.

SUMMARY OF THE INVENTION

A first aspect of the invention provides a method of assembling a plurality of objects in a work zone using a camera and a projector, the method comprising:
 creating, in respect of a current scene in the work zone, a current scene pixel map by mapping pixels of said camera to pixels of said projector;
 comparing said current scene pixel map with a corresponding other scene pixel map;
 creating a projector pixel set depending on the, or each, difference between said current scene pixel map and said corresponding other scene pixel map; and
 causing said projector to illuminate said work zone using said projector pixel set.

Preferably, creating said current scene pixel map involves causing the projector to project a light pattern with a known structure to said work zone, causing said camera to capture the projected structured light pattern, and mapping said camera pixels with said projector pixels using said light pattern structure.

Preferably, causing the projector to project said light pattern with a known structure to said work zone involves causing said projector to project a sequence of images to said work zone.

Preferably, comparing said current scene pixel map with said corresponding other scene pixel map involves determining the or each difference between said current scene pixel map with said corresponding other scene pixel map.

Preferably, comparing said current scene pixel map with said corresponding other scene pixel map involves subtracting said current scene pixel map from said corresponding other scene pixel map, or subtracting said other corresponding scene pixel map from said current scene pixel map.

Preferably, in a training mode, creating said current scene pixel map involves creating a respective current scene pixel map for each assembly step, wherein the respective current scene is a correct scene for the respective assembly step, and wherein the respective corresponding other scene pixel map is a scene pixel map for a reference scene or for a previous assembly step.

Preferably, in a guidance mode, in respect of each assembly step, causing said projector to illuminate the work zone involves using the projector pixel set created in said training mode for the respective assembly step.

Preferably, in a verification mode, creating said current scene pixel map involves creating a respective current scene pixel map for each assembly step, wherein the respective corresponding other scene pixel map is the scene pixel map created during the training mode for the respective assembly step.

Preferably, in said verification mode, in respect of each assembly step, causing said projector to illuminate the work zone involves using the projector pixel set created in said verification mode for the respective assembly step.

Optionally, the method further includes, for each assembly step in said verification mode, directly or indirectly determining a size of said projector pixel set, and causing said projector to illuminate said work zone using said projector pixel set if said size exceeds a threshold value.

A second aspect of the invention provides an assembly system comprising:
 at least one camera;
 at least one projector;
 means for creating, in respect of a current scene in a work zone, a current scene pixel map by mapping pixels of said at least one camera to pixels of said at least one projector;
 means for comparing said current scene pixel map with a corresponding other scene pixel map;
 means for creating a projector pixel set depending on the, or each, difference between said current scene pixel map and said corresponding other scene pixel map; and
 means for causing said at least one projector to illuminate said work zone using said projector pixel set.

The method may include a training mode in which the correct assembly steps are learned, a guidance mode in which a user is guided through the assembly steps, and preferably also a verification mode in which the actual assembly steps are verified.

Further advantageous aspects of the invention will be apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which:

FIG. 5A is a perspective view of the system of FIG. 2A, with the projector projecting a first guidance image onto the work surface;

FIG. 5B is a representation of the projector pixel set used to create the first guidance image;

FIG. 6A is a perspective view of the system of FIG. 5A, including a first object placed incorrectly on the work surface;

FIG. 6B is a representation of a scene map of the work zone of FIG. 6A;

FIG. 6C is a perspective view of the system of FIG. 5A, with the projector projecting a guidance image onto the work zone;

FIG. 6D is a representation of a projector pixel set created used to create the guidance image of FIG. 6C;

FIG. 12A is a representation of a first scene map;

FIG. 12B is a representation of a second scene map; and

FIG. 12C is a representation of a difference map representing the difference between the first scene map and the second scene map.

DETAILED DESCRIPTION OF THE DRAWINGS

Figure 1:
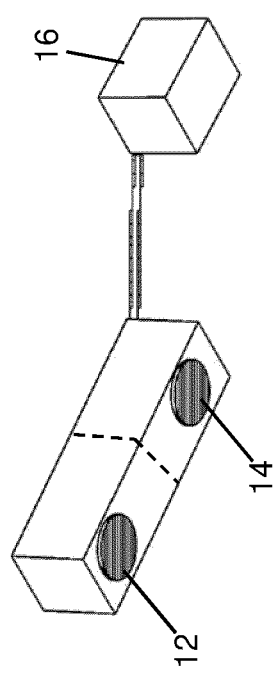
FIG. 1 is a perspective view of a projector, a camera and a controller, being part of a projector assembly system embodying one aspect of the invention.

Referring now to FIG. 1 of the drawings there is shown, generally indicated as 10, a projector assembly system embodying one aspect of the invention. The system 10 comprises a digital projector 12 and a digital camera 14. The projector 12 and camera 14 may be provided in a common unit, as illustrated, or may be provided separately as is convenient. The system 10 further includes a controller 16 for controlling the operation of the projector 12 and camera 14, and for performing data processing as is described in more detail hereinafter. In alternative embodiments, more than one camera 14 and/or more than one projector 12 may be provided.

The projector 12 may be any conventional digital image projector or digital video projector, and may use any conventional digital projection technology to project light. For example, the projector 12 may be an LCD projector, a Digital Light Processing (DLP) projector, an LCoS projector, an LED projector, a laser diode projector, a laser projector or a hybrid projector. In any case, the projector 12 is configured to project light to create an image, or sequence of images, wherein each image is defined by an array (typically a two dimensional array) of pixels. Typically, the projector 12 comprises an array (not shown) of optical projector devices (e.g. mirrors or LEDs) for creating the projector images, the array typically having a respective optical device for each pixel. As such, the projector 12 supports the projection of images defined by an array of projector pixels.

The camera 14 may be any conventional digital image camera or digital video camera and may comprise any conventional digital image sensor (not shown). The camera 14 is configured to detect images as an array (typically a two dimensional array) of pixels. Typically, the image sensor comprises an array of optical detectors (e.g. comprising photodiode(s)), each optical detector corresponding to a respective pixel. As such, the camera 14 supports the capture of images defined by an array of camera pixels.

In the illustrated embodiment, the controller 16 comprises a computer or computer system running one or more computer program for causing the system 10 to operate as described herein. More generally, the controller 16 may take any convenient form, typically comprises one or more suitably programmed microprocessor, microcontroller or other processing device. The controller 16 may be connected to the projector 12 and camera 14 by any suitable wired and/or wireless communication link(s), and/or may be integrated with the projector 12 and/or the camera 14. The controller 16 may be implemented locally or in a distributed manner as is convenient, e.g. across one or more telecommunication network. The tasks performed by the controller 16 may be performed locally or remotely as is convenient, e.g. across one or more telecommunication network.

The system 10 includes a work zone 21, which typically but not necessarily includes a work surface 20. In this example the work surface 20 is provided by a workstation 18. The work surface 20 is typically flat. In this example, the work zone 21 may be said to comprise the work surface 20 and the space above the work surface 20 in which a multi-part structure can be assembled. In alternative embodiments, the work zone may comprise any region of free space in which an assembly process is to take place, and is typically but not necessarily located adjacent a surface (e.g. a bench top, a wall, a floor or a ceiling).

The projector 12 is positioned so that it can project light into the work zone 21, which typically involves projecting light onto the work surface 20 or onto an object or structure located on the work surface 20. The camera 14 is positioned so that it can capture images of the work zone 21, in this case of the work surface 20 and/or of an object or structure located on the work surface 20.

The system 10 is configured to perform a pixel mapping process whereby the projector pixels, i.e. the pixels of images projected by the projector 12, are mapped to the camera pixels, i.e. the pixels of images captured by the camera 14. This may be achieved using any suitable conventional pixel mapping method, and is conveniently performed by the controller 16. For example, pixel mapping may involve causing the projector 12 to project at least one image, but typically a sequence of images, onto the work surface 20, the images being recorded by the camera 14. Each image has a known definition with respect to the projector pixels. Each corresponding image captured by the camera 14 has a known definition with respect to the camera pixels. Accordingly, for each image, a comparison can be made between the projector pixels (more particularly the pixel values) and the corresponding camera pixels (more particularly the pixel values) to create a pixel map that defines a correspondence between the projector pixels and the camera pixels. Depending on intrinsic characteristics of the projector and camera, the pixel map does not necessarily map whole camera pixels to whole projector pixels, e.g. it may map whole pixels to whole pixels, or map whole pixels to sub-pixels (or fractional pixels), or map sub-pixels (or fractional pixels) to sub-pixels (or fractional pixels). The image, or sequence of images, may be configured in accordance with any suitable structured light pattern, for example a binary tree pattern, that facilitates the creation of a pixel correspondence map.

Figure 11:
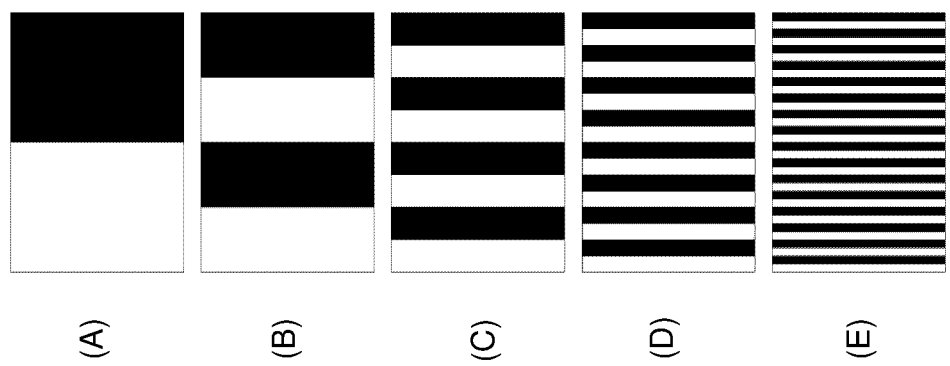
FIG. 11 shows an exemplary sequence of projector images that may be used during a pixel mapping process.

FIG. 11 shows an example of a sequence of projector images (A) to (E) that are suitable for use in the pixel mapping process. The images (A) to (E) embody a structured pattern, in particular a binary tree pattern. Each image (A) to (E) comprises a respective pattern of relatively light and relatively dark regions, the respective patterns causing different regions of the work zone 21 to be illuminated as light or dark as each image is projected in sequence (A) to (E). In this example the respective pattern of each image (A) to (E) follows a binary tree structure. Each camera pixel will detect either light or dark during the projection of each image (A) to (E). By comparing what each camera pixel detects during projection of the images with the respective image patterns, a location of the camera pixel with respect to the image area can be determined. Since the location of each projector pixel is known with respect to the image area, then the location of each camera pixel can be mapped to the location of a corresponding projector pixel (or sub-pixel/fractional pixel as applicable).

Other examples of how pixel mapping may be performed are described in "Recent Progress in Coded Structured Light as a Technique to Solve the Correspondence Problem: A Survey" by J. Battle et al., Pattern Recognition, Vol. 31, No. 7, pp. 963-982, 1998.

Figure 2B:
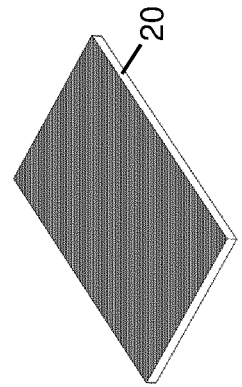
FIG. 2B is a representation of a reference map of a work surface.
Figure 2A:
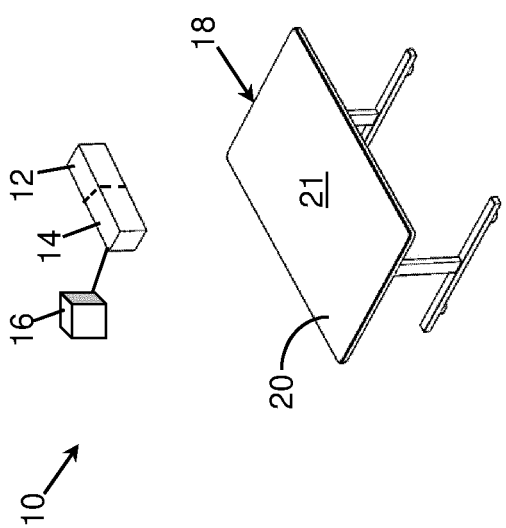
FIG. 2A is a perspective view of the projector assembly system embodying one aspect of the invention.
Figure 4D:
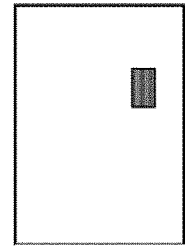
FIG. 4D is a representation of a projector pixel set created using the difference map of FIG. 4C.
Figure 9:
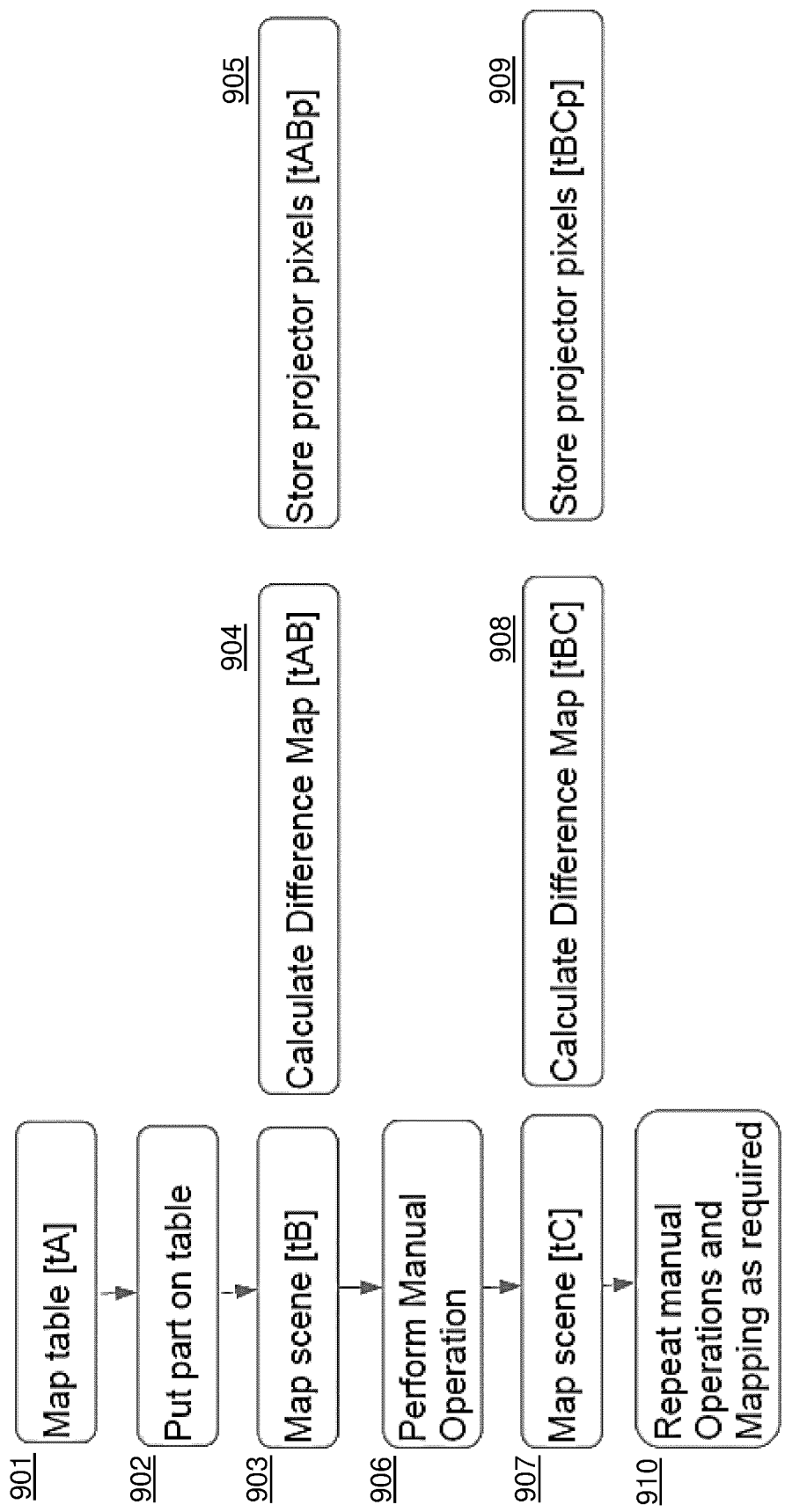
FIG. 9 is a flow chart illustrating a training mode supported by preferred embodiments of the invention.

The preferred system 10 is operable in a training mode and in a guidance and verification mode. The preferred training mode is now described with reference to FIGS. 2A to 4D and FIG. 9. A reference scene pixel map [tA] is created (FIGS. 2A, 2B and FIG. 9, step 901). Preferably this operation is performed with no objects on the work surface 20 or otherwise in the work zone 21. In the preferred embodiment, creating the reference scene pixel map [tA] involves performing pixel mapping as described above. Accordingly, the reference scene pixel map [tA] defines a correspondence between the projector pixels and the camera pixels for the reference scene. The creation of the reference map [tA] may be performed by the controller 16 or the camera 14 as is convenient, and stored in electronic memory.

Next an object 22 is placed in the work zone 21 in its correct state, usually on the work surface 20 (FIG. 3A and FIG. 9, step 902), e.g. by a user or robot (not shown). The correct state may comprise a desired position, e.g. location and/or orientation, of the object 22 with respect to the work zone 21. The object 22 may for example be a first part of a multi-part structure that is to be assembled. A first training scene pixel map [tB] is created, and is representative of the scene in which the object 22 is in the correct state (FIG. 3B and FIG. 9, step 903). In the preferred embodiment, creating the first training scene pixel map [tB] involves performing pixel mapping as described above. Accordingly, the first training scene pixel map [tB] defines a correspondence between the projector pixels and the camera pixels for the scene corresponding to the first step in the assembly process. The creation of the first scene map [tB] may be performed by the controller 16 or the camera 14 as is convenient, and stored in electronic memory.

Figure 3D:
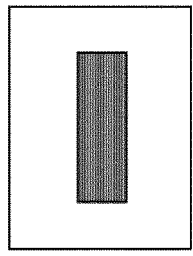
FIG. 3D is a representation of a projector pixel set created using the difference map of FIG. 3C.
Figure 3C:
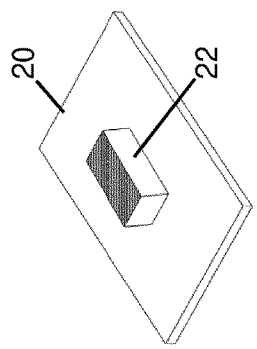
FIG. 3C is a representation of a difference map indicating the difference between the scene map of FIG. 3B and the reference map of FIG. 2B.
Figure 3B:
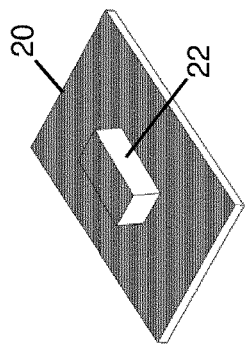
FIG. 3B is a representation of a scene map of the work zone and object.

The first training scene map [tB] is compared to the reference map [tA] to create a first training difference map [tAB] (FIG. 3C and FIG. 9, step 904). The first training difference map [tAB] comprises data representing the difference between the first scene pixel map [tB] and the reference pixel map [tA]. For example, the difference map [tAB] may comprise or otherwise identify a set of one or more pixels that are determined to have different values when the comparison of the first scene pixel map and the reference pixel map is performed, The first training difference map [tAB] may be calculated using any conventional technique for calculating the difference between data sets, and may be calculated directly from the scene map and reference map, or from data derived therefrom, as desired. Conveniently, the first training difference map [tAB] is calculated by subtracting the reference pixel map [tA] from the first scene pixel map [tB]. Conveniently, the controller 16 calculates the first difference map [tAB].

The first training difference map [tAB] determines a set of training projector pixels [tABp] (FIG. 3D and FIG. 9, step 905) that determines how the projector 12 illuminates the work zone 21 during a guidance mode described hereinafter. For example the projector pixels [tABp] may comprise the set of pixels of the difference map [tAB], or may be derived therefrom in any suitable manner, e.g. using conventional 3D projection method(s), or other mathematical transformation(s). In any event, the contents of the difference map determine which projector pixels are illuminated during the guidance mode. The training projector pixels [tABp] are stored in electronic memory.

In preferred embodiments, the training projector pixel data [tABp] is associated with a first step in an assembly process, the first step comprising placement of the object 22 in this example. Typically, the assembly process includes multiple assembly steps and steps 902 to 905 of the training mode are performed for each step of the assembly process. This is illustrated in FIGS. 4A to 4D and FIG. 9 steps 906 to 909 in respect of a second step in the assembly process. In this example it is assumed that the second step of the assembly process comprises adding object 24 to object 22. The object 24 is placed in the work zone 21 in its correct state (FIG. 4A and FIG. 9, step 906), e.g. by a user or robot. The correct state may comprise a desired position, e.g. location and orientation, of the object 24 in the work zone 21, and/or a desired state of assembly with the object 22. The object 24 is in this example a second part of a multi-part structure that is to be assembled. A second training scene pixel map [tC] is created and is representative of the scene in which the new object 24 (and the preceding object 22) is in its correct state (FIG. 4B and FIG. 9, step 907). Advantageously, creating the second training scene pixel map [tC] involves performing pixel mapping as described above. Accordingly, the second reference scene pixel map [tC] defines a correspondence between the projector pixels and the camera pixels for the scene corresponding to the second step in the assembly process (the scene in this case comprising the work surface 20 with the assembled objects 22, 24 located thereon). The creation of the second scene pixel map [tC] may be performed by the controller 16 or the camera 14 as is convenient, and stored in electronic memory.

Figure 4C:
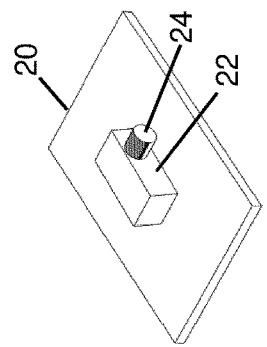
FIG. 4C is a representation of a difference map indicating the difference between the scene map of FIG. 4B and the scene map of FIG. 3B.
Figure 4B:
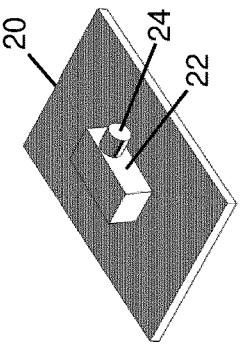
FIG. 4B is a representation of a scene map of the work zone and first and second objects.
Figure 3A:
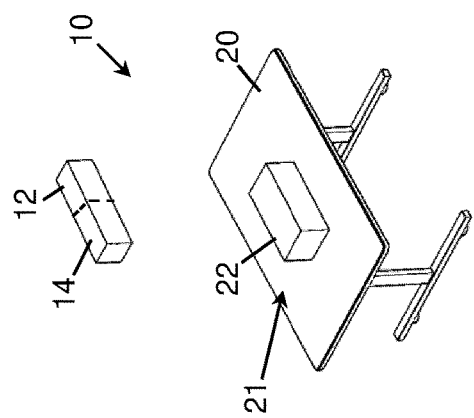
FIG. 3A is a perspective view of the system of FIG. 2A, including a first object placed on a work surface being part of a work zone.
Figure 4A:
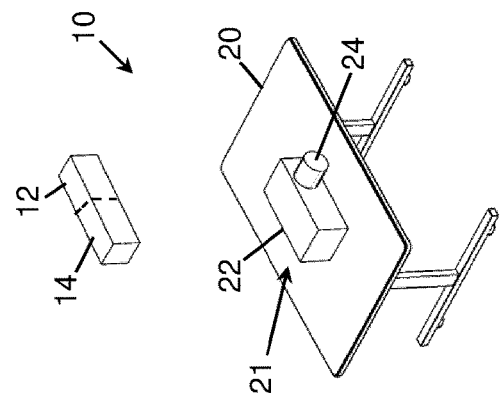
FIG. 4A is perspective view of the system of FIG. 3A with a second object added to the first object.

The second scene pixel map [tC] is compared to the preceding training scene pixel map [tB] to create a second training difference map [tBC] (FIG. 4C and FIG. 9, step 908). The second training difference map [tBC] comprises data representing the difference between the second scene pixel map [tC] and the first scene pixel map [tB]. For example, the difference map [tBC] may comprise or otherwise identify a set of one or more pixels that are determined to have different values when the comparison of the second training scene pixel map and the first training scene pixel map is performed, The second training difference map [tBC] may be calculated using any conventional technique for calculating the difference between data sets, and may be calculated directly from the current scene map and previous scene map, or from data derived therefrom, as desired. Conveniently, the second training difference map [tAB] is calculated by subtracting the first scene pixel map [tB] from the second scene pixel map [tC]. Conveniently, this is performed by the controller 16.

The second training difference map [tBC] define a set of training projector pixels [tBCp] (FIG. 4D and FIG. 9, step 909) that are associated with the second step in the assembly process, namely the addition of object 24 to object 22 in this example. The set of training projector pixels determine how the projector 21 illuminates the work zone 21 during the second step. For example the projector pixels [tBCp] may comprise the set of pixels of the difference map [tBC], or may be derived therefrom in any suitable manner, e.g. using conventional 3D projection method(s), or other mathematical transformation(s). In any event, the contents of the difference map determine which projector pixels are illuminated during the second step. The training projector pixels [tBCp] are stored in electronic memory.

As indicated at step 901 of FIG. 9, the steps of placing an object in the work zone 21 in its correct state, creating a current scene pixel map of the object (together with the, or each, other object already provided in the work zone 21), creating a current training difference map from the current scene pixel map and the immediately preceding scene pixel map, and creating a pixel set for the current object using the current difference map, are performed for each object to be added to the work zone 21. Typically, each object is a part of a multi-part structure that is to be assembled in the work zone 21. As such, in respect of at least some of the objects, and typically for all but the first object 22, the step of placing an object in the work zone 21 in its correct state comprises assembling the respective object with one or more objects already present in the work zone 21. The correct state of an object may comprise a desired position, e.g. location and/or orientation, of the object in the work zone 21, and/or a desired state of assembly with one or more other object already present in the work zone 21.

At each stage of the training process, the user may prompt the system 10 to create the respective pixel maps at an appropriate time by activating any convenient user input means (not shown). When the training mode is complete, a respective training projector pixel set has been created and stored in respect of each object that forms part of the multi-part structure to be assembled, i.e. in respect of each step in the assembly process.

The preferred guidance and verification mode is now described with reference to FIGS. 5A to 8B and FIG. 10. During the guidance and verification mode, a human user (not shown) places objects in the work zone 21 under the guidance of the projector 12, typically in order to assemble the multi-part structure. Each object corresponds with an object that was placed in a correct state during the training mode, and so is associated with a respective projector pixel set that is indicative of the correct state of the object. Advantageously, the camera 14 may be used to verify the placement of each object and, if necessary, the projector 12 may be used to provide further guidance in relation to placement of the object. When performing the guidance and verification mode, it is preferred that the set up of the system 10, in particular the configuration of the projector 12, camera 14 and workstation 18, is the same as it was during the training mode. However, the guidance and verification mode need not be performed using the same system 10, but could alternatively be performed using a system with the same set up.

Figure 7A:
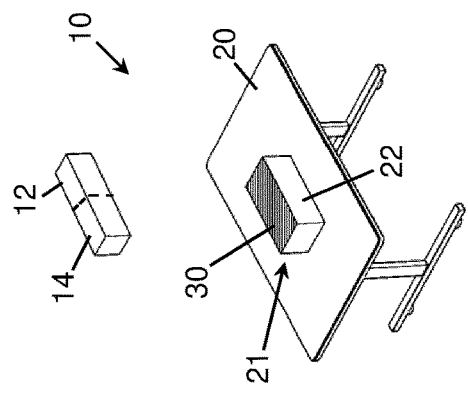
FIG. 7A is a perspective view of the system of FIG. 5A, including the first object placed correctly on the work surface.
Figure 10:
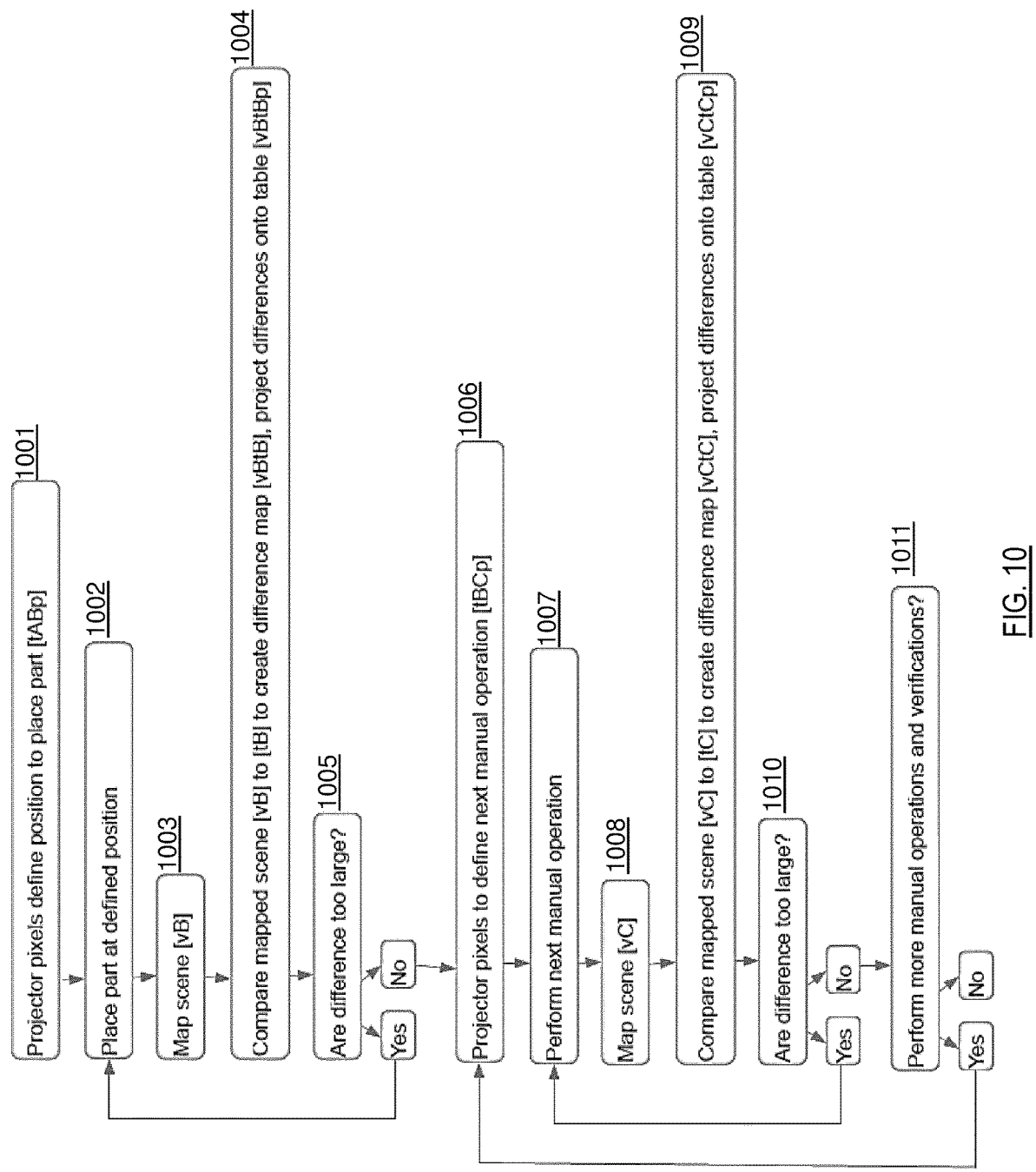
FIG. 10 is a flow chart illustrating a guidance and verification mode supported by preferred embodiments of the invention.

Using the training projector pixel set [tABp] associated with the first object 22, the projector 12 is caused to project a corresponding first guidance image 30 to the work zone, typically at least partly on to the work surface 20, corresponding to the correct state for the object 22 (FIGS. 5A, 5B and FIG. 10 step 1001). In particular, the image 30 may indicate the correct position of the object 22, e.g. the correct location and/or orientation, or just the location if the object is symmetrical. The user then places the object 22 in the work zone 21 using the image 30 for guidance (FIG. 6A, FIG. 7A, FIG. 10, step 1002).

Figure 7B:
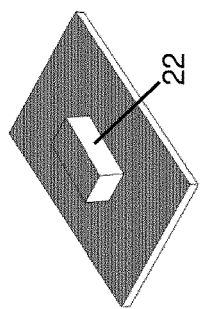
FIG. 7B is a representation of a scene map of the work zone of FIG. 7A.

A first verification scene pixel map [vB] is created representing the scene with the user-placed object 22 (FIG. 6B, FIG. 7B and FIG. 10, step 1003). In the preferred embodiment, creating the first verification scene pixel map [vB] involves performing pixel mapping as described above. Accordingly, the first verification scene pixel map [vB] defines a correspondence between the projector pixels and the camera pixels for the scene corresponding to the user's first step in the assembly process (the scene in this case comprising the work surface 20 with the user-placed object 22 located thereon). The creation of the verification scene map [vB] may be performed by the controller 16 or the camera 14 as is convenient, and stored in electronic memory.

The first verification scene pixel map [vB] is compared to the first training scene pixel map [tB]. If the first verification scene map [vB] matches the first training scene map [tB], then it may be determined that the object 22 has been placed in the correct state, otherwise it may be determined that the object 22 has been placed in the work zone incorrectly. In this context, the maps may be deemed to match if they match each other exactly, and/or if they match each other approximately (e.g. being different by less than a threshold amount by any suitable measure), depending on the requirements of the embodiment.

The first verification scene pixel map [vB] is compared to the first training scene pixel map [tB] to create a first verification difference map [vBtB] (FIG. 6C and FIG. 10, step 1004). The first verification difference map [vBtB] represents the difference between the first verification scene map [vB] and the first training scene map [tB]. For example, the difference map [vBtB] may comprise or otherwise identify a set of one or more pixels that are determined to have different values when the comparison of the first verification scene pixel map and the first training scene map is performed, The first verification difference map [vBtB] may be calculated using any conventional technique for calculating the difference between data sets and may be calculated directly from the verification scene map and corresponding training scene map, or from data derived therefrom, as desired. Conveniently, the first verification difference map [vBtB] is calculated by subtracting the first verification scene pixel map [vB] from the first training scene pixel map [tC], or vice versa.

The first verification difference map [vBtB] determines a set of verification projector pixels [vBtBp] (FIG. 6D and FIG. 10, step 1004) that determines how the projector 21 illuminates the work zone 21 during the relevant step of the verification mode. For example the projector pixels [vBtBp] may comprise the set of pixels of the corresponding difference map [vBtB], or may be derived therefrom in any suitable manner, e.g. using conventional 3D projection method(s), or other mathematical transformation(s). In any event, the contents of the difference map determine which projector pixels are illuminated during the verification mode. Conveniently, this is performed by the controller 16 and stored in electronic memory.

If the user has placed the object 22 correctly in the work zone 21, i.e. such that it is coincident with the guidance image 30 (for example as illustrated in FIG. 7A), then the first verification difference map [vBtB] indicates no difference between the first training scene map [tB] (see FIG. 3B by way of example) and the first verification scene map [tB] (see FIG. 7B by way of example). The first verification difference map [vBtB] may therefore comprise a null or empty data set. Correspondingly, the respective verification projector pixel data [vBtBp] may comprise a null or empty pixel set.

However, if the user has not placed the object 22 correctly in the work zone 21, i.e. such that it is not coincident with, or only partly coincident with, the guidance image 30 (for example as illustrated in FIG. 6A), then the first verification difference map [vBtB] comprises data representing the differences between the first training scene map [tB] (see FIG. 3B by way of example) and the first verification scene map [tB] (see FIG. 6B by way of example). The respective set of verification projector pixels [vBtBp] are determined by the difference between the first training scene map [tB] and the first verification scene map [tB], and determine the projector 21 illuminates the work zone 21 during the relevant step of the verification mode.

Using the verification projector pixel set [vBtBp], the projector 12 is operable to project a corresponding verification image 32 onto the current scene, i.e. the scene comprising the user-placed object 22 and work surface 20 in this example (FIG. 6C and FIG. 10, step 1004). The verification image 32 indicates differences between the actual position of the object 22 and the correct position. As such, the user can tell from the verification image 32 that the object 22 is incorrectly placed, as well as obtaining an indication of how the object 22 should be re-positioned. If the object 22 is placed correctly and the verification projector pixel set [vBtBp] is a null set, then no verification image 32 is projected by the projector 12, or the projector 12 may be configured to project an image that indicates correct placement of the object 22.

If required, the user may re-position the object 22, advantageously using the verification image 32 for guidance, and steps 1003 and 1004 may be repeated.

In some embodiments, the system 10 may be configured to prevent the user from proceeding to placement of the next object 24 in the work zone 21 until the current object 22 is in its correct state, e.g. until the respective verification difference map [vBtB] and/or corresponding verification projector pixel set [vBtBp] indicate that there is no difference between the actual state of the object 22 and its correct state. In preferred embodiments, the system 10 is configured to allow some discrepancy between the actual state of the object 22 and its correct state, i.e. to deem the object 22 to be in the correct state not only if it is precisely in the correct state, but also if it is substantially in the correct state but not precisely in the correct state. This may be achieved by setting a threshold for the size of the verification difference map [vBtB] and/or the size of the verification projector pixel set [vBtBp], and deeming the object to be in its correct state if the size of the verification difference map [vBtB] and/or the size of the verification projector pixel set [vBtBp] is less than or equal to the threshold amount.

With reference to step 1005 of FIG. 10, if the system 10 determines that the object 22 is not in the correct state, which in this embodiment involves determining if the size of the verification difference map [vBtB] and/or the size of the verification projector pixel set [vBtBp] exceeds the threshold amount, then steps 1002 to 1004 are repeated wherein the user re-positions the object 22 in step 1002. Alternatively, if the system 10 determines that the object 22 is correctly positioned, which in this embodiment involves determining if the size of the verification difference map [vBtB] and/or the size of the verification projector pixel set [vBtBp] is less than or equal to the threshold amount, then the user may proceed with placement of the next object 24.

At each stage of the guidance and verification process, the user may prompt the system 10 to project guidance images, create the respective pixel maps, and project verification images at appropriate times by activating any convenient user input means (not shown). The user may also cause the system 10 to proceed from one step of the assembly process to the next by activating any convenient user input means. Optionally, the system 10 may be configured not to proceed to a next step until the previous step has been verified.

FIGS. 8A to 8D and FIG. 10, steps 1006 to 1010 illustrate the second step in the assembly process, which in this example comprises adding object 24 to object 22. Conveniently, steps 1006 to 1010 correspond to steps 1001 to 1005 and the same or similar description applies as would be apparent to a skilled person.

Figure 8A:
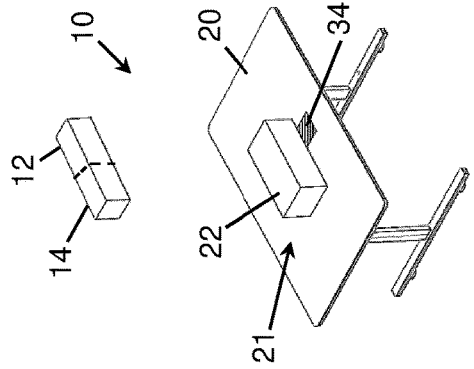
FIG. 8A is a perspective view of the system of FIG. 7A, with the projector projecting a guidance image onto the work zone.
Figure 8B:
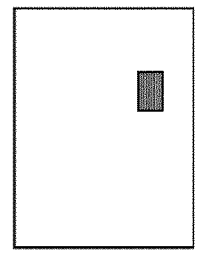
FIG. 8B is a representation of the projector pixel set used to create the guidance image of FIG. 8A.

In this case, using the training projector pixel set [tBCp] associated with the second object 24, the projector 12 is caused to project a corresponding guidance image 34 to the work zone 21, typically onto the work surface 20, corresponding to the correct state for the object 24 (FIGS. 8A, 8B and FIG. 10 step 1006). The user then places the object 24 in the work zone 21 using the image 34 for guidance (FIG. 8C and FIG. 10, step 1007).

Figure 8D:
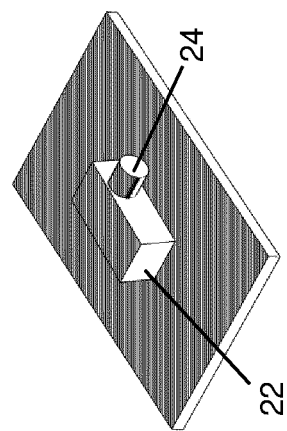
FIG. 8D is a is a representation of a scene map of the work zone of FIG. 8A.
Figure 8C:
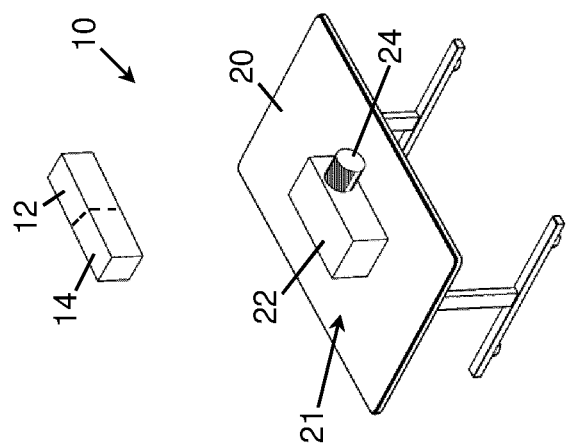
FIG. 8C is a perspective view of the system of FIG. 7A, including a second object added to the correctly placed first object.

A verification scene pixel map [vC] is created representing the current scene, i.e. the work zone 21 with the user-placed objects 22, 24 (FIG. 8D and FIG. 10, step 1008). Preferably, creating the first verification scene map [vC] involves performing pixel mapping as described above. Accordingly, the second verification scene pixel map [vB] defines a correspondence between the projector pixels and the camera pixels for the scene corresponding to the user's second step in the assembly process. The creation of the verification scene map [vC] may be performed by the controller 16 or the camera 14 as is convenient, and stored in electronic memory.

The current (i.e. the second in this example) verification scene pixel map [vC] is compared to the corresponding training scene pixel map [tC]. If the verification scene map [vC] matches the corresponding training scene map [tC], then it may be determined that the object 24 has been placed in the correct state, otherwise it may be determined that the object 24 has been placed in the work zone incorrectly. In this context, the maps may be deemed to match if they match each other exactly, and/or if they match each other approximately (e.g. being different by less than a threshold amount by any suitable measure), depending on the requirements of the embodiment.

The current verification scene pixel map [vC] is compared to the corresponding training scene pixel map [tC] to create a respective verification difference map [vCtCp] (FIG. 10, step 1009). The verification difference map [vCtC] comprises data representing the difference between the verification scene map [vC] and the corresponding training scene map [tC]. The verification difference map [vCtC] determines a set of verification projector pixels [vCtCp] (FIG. 10, step 1009). Conveniently, this is performed by the controller 16 and stored in electronic memory.

Using the verification projector pixel data [vCtCp], the projector 12 is operable to project a corresponding verification image onto the current scene. If required (FIG. 10, step 1010), the user may re-position the object 24, advantageously using the verification image for guidance, and steps 1007 and 1009 may be repeated.

As indicated in step 1011 of FIG. 10, steps 1006 to 1010 may be repeated in respect of each object that is part of the multi-part structure. The guidance and verification process is complete once all of the relevant objects are correctly positioned in the work zone 21, and the resulting multi-part structure is assembled.

Advantageously, the preferred pixel mapping process for creating the scene maps as outlined above does not require calibration between the projector 12 and camera 14. In some embodiments, the scene maps and difference maps may be used directly to obtain the respective projector pixel set for determining how the projector 12 illuminates the work seen. For example, the projector pixel set may comprise the pixel(s) identified in the respective difference map. Alternatively, the scene maps and/or the difference maps may be transformed in order to determine the projector pixel set. The transformation may involve application of any suitable conventional mathematical operation(s) for the purpose of projection, e.g. 3D projection. Transforming the relevant pixel map(s) for 3D projection typically requires 3D calibration of the projector and camera, and this may be performed in any conventional manner.

It will be understood that the training mode does not have to be performed by the same individual who performs assembly under the guidance and verification mode, and that the training mode and guidance and verification mode do not have to be performed together—they may be performed at different times, by different people and using different systems. Optionally, the guidance mode may be performed without verification, or verification may be performed without guidance.

By way of illustration, FIGS. 12A and 12B each shows a respective exemplary (simplistic) scene pixel map, which may for example be a training scene map or a verification scene map. In the case where both scene maps are training scene maps it is assumed that the map of FIG. 12B is associated with the training scene (or training step) that follows the training scene (or training step) with which the map of FIG. 12A is associated. In the case where the map of FIG. 12A is a verification map and the map of FIG. 12B is a training scene map, it is assumed that they are associated with the same step in the assembly process.

Each of the scene maps defines a correspondence between camera pixels and projector pixels. For example, in the map of FIG. 12A, the camera pixel with the (x,y) co-ordinates (0,0) corresponds to the projector pixel with (x,y) co-ordinates (0,0) (denoted as P(0,0) in FIG. 12A), while the camera pixel with the (x,y) co-ordinates (3,2) corresponds to the projector pixel with (x,y) co-ordinates (3,2) (denoted as P(3,2) in FIG. 12A), and so on. In this example, the respective mappings defined by the map of FIG. 12A and the map of FIG. 12B are different in respect of camera pixels (1,1), (2, 1), (3,1), (1,2), (2,2), (3,2), (1,3), (2,3) and (3,3). These differences are a result of differences in the respective scene in respect of which each map was created. FIG. 12C shows a difference map representing the difference between the maps of FIGS. 12A and 12B. In particular, the difference map of FIG. 12C is calculated by subtracting the respective values of the map of FIG. 12A from the map of FIG. 12B. It can be seen that the difference is zero for all pixel locations other than those of camera pixels (1,1), (2,1), (3,1), (1,2), (2,2), (3,2), (1,3), (2,3) and (3,3). Each of the non-zero pixel locations of the difference map corresponds to a respective projector pixel, and together the non-zero pixel locations of the difference map determine the set of projector pixels that are used to illuminate the work zone during guidance and verification, as applicable.

The invention is not limited to the embodiment(s) described herein but can be amended or modified without departing from the scope of the present invention.

The invention claimed is:

1. A method of assembling a plurality of objects in a work zone using a camera and a projector, wherein said camera is configured to capture images defined by camera pixels, and said projector is configured to project images defined by projector pixels, the method comprising:

in a training mode, in respect of a first step of a sequence of assembly steps:
arranging at least one object correctly in said work zone;
causing said projector to illuminate a first current scene in said work zone by projecting at least one projector image onto said work zone, wherein said at least one projector image is defined by projector pixels, wherein said first current scene comprises said at least one object correctly arranged in said work zone;
causing said camera to capture at least one captured image of said first current scene in said work zone illuminated by said at least one projector image, wherein said at least one captured image is defined by camera pixels;
mapping the camera pixels of said at least one captured image to the projector pixels of said at least one projector image to create a first current scene pixel map that defines a correspondence between said camera pixels and said projector pixels for said first step of said sequence of assembly steps;
comparing said first current scene pixel map with a corresponding other reference scene pixel map for said work zone to identify at least one difference between said first current scene pixel map and said reference scene pixel map;

creating a projector pixel set for said first step, said projector pixel set representing said at least one difference identified between said first current scene pixel map and said reference scene pixel map; and in said training mode, in respect of each subsequent step of said sequence of assembly steps:
  arranging at least one other object correctly in said work zone, and/or rearranging said at least one object in said work zone;
  causing said projector to illuminate a respective current scene in said work zone by projecting at least one projector image onto said work zone, wherein said at least one projector image is defined by projector pixels;
  causing said camera to capture at least one captured image of said respective current scene in said work zone illuminated by said at least one projector image, wherein said at least one captured image is defined by camera pixels;
  mapping the camera pixels of said at least one captured image to the projector pixels of said at least one projector image to create a respective current scene pixel map that defines a correspondence between said camera pixels and said projector pixels for the respective subsequent step of said sequence of assembly steps;
  comparing said respective current scene pixel map with a preceding scene pixel map for a preceding step of said sequence of assembly steps to identify at least one difference between said respective current scene pixel map and said preceding scene pixel map;
  creating a projector pixel set for the respective subsequent step, said projector pixel set representing said at least one difference identified between said respective current scene pixel map and said preceding scene pixel map; and in a guidance mode or in a verification mode, in respect of said first step:
  causing said projector to illuminate said work zone using said projector pixel set for said first step to indicate, by illumination of said work zone, said at least one difference identified between said first current scene pixel map and said reference scene pixel map, and in said guidance mode or in said verification mode, in respect of each subsequent step of said sequence of assembly steps:
  causing said projector to illuminate said work zone using said projector pixel set for the respective subsequent step to indicate, by illumination of said work zone, said at least one difference identified between said respective current scene pixel map and said preceding scene pixel map.

2. The method of claim 1, wherein creating said first current scene pixel map and said respective current scene pixel map involves causing the projector to project a light pattern with a known structure to said work zone, causing said camera to capture the projected structured light pattern, and mapping said camera pixels with said projector pixels using said light pattern structure.

3. The method of claim 2, wherein causing the projector to project said light pattern with a known structure to said work zone involves causing said projector to project a sequence of images to said work zone.

4. The method of claim 1, wherein comparing said first current scene pixel map with said reference scene pixel map involves determining the or each difference between said first current scene pixel map with said reference scene pixel map, and wherein said comparing said respective current scene pixel map with said preceding scene pixel map involves determining the or each difference between said respective current scene pixel map with said preceding scene pixel map.

5. The method of claim 1, wherein comparing said first current scene pixel map with said reference scene pixel map involves subtracting said current scene pixel map from said reference scene pixel map, or subtracting said reference scene pixel map from said first current scene pixel map, and wherein said comparing said respective current scene pixel map with preceding scene pixel map involves subtracting said respective current scene pixel map from said preceding scene pixel map, or subtracting said preceding reference scene pixel map from said respective current scene pixel map.

6. The method of claim 1, further including, in said verification mode, for said first step and said respective subsequent step, directly or indirectly determining a size of said projector pixel set, and causing said projector to illuminate said work zone using said projector pixel set if said size exceeds a threshold value.

7. An assembly system comprising:
  at least one camera configured to capture images defined by camera pixels;
  at least one projector configured to project images defined by projector pixels;
  and a computer-implemented controller,
  said controller being configured to, in a training mode, in respect of a first step of a sequence of assembly steps:
    cause said projector to illuminate a first current scene in said work zone by projecting at least one projector image onto said work zone, wherein said at least one projector image is defined by projector pixels, wherein said first current scene comprises said at least one object correctly arranged in said work zone;
    cause said camera to capture at least one captured image of said first current scene in said work zone illuminated by said at least one projector image, wherein said at least one captured image is defined by camera pixels;
    map the camera pixels of said at least one captured image to the projector pixels of said at least one projector image to create a first current scene pixel map that defines a correspondence between said camera pixels and said projector pixels for said first step of said sequence of assembly steps;
    compare said first current scene pixel map with a reference scene pixel map for said work zone to identify at least one difference between said first current scene pixel map and said reference scene pixel map; and
    create a projector pixel set for said first step, said projector pixel set representing said at least one difference identified between said first current scene pixel map and said reference scene pixel map, said controller being further configured to, in said training mode, in respect of each subsequent step of said sequence of assembly steps:
    cause said projector to illuminate a respective current scene in said work zone by projecting at least one projector image onto said work zone, wherein said at least one projector image is defined by projector pixels;
    cause said camera to capture at least one captured image of said respective current scene in said work zone illuminated by said at least one projector image, wherein said at least one captured image is defined by camera pixels;

map the camera pixels of said at least one captured image to the projector pixels of said at least one projector image to create a respective current scene pixel map that defines a correspondence between said camera pixels and said projector pixels for the respective subsequent step of said sequence of assembly steps;

compare said respective current scene pixel map with a preceding scene pixel map for a preceding step of said sequence of assembly steps to identify at least one difference between said respective current scene pixel map and said preceding scene pixel map; and create a projector pixel set for the respective subsequent step, said projector pixel set representing said at least one difference identified between said respective current scene pixel map and said preceding scene pixel map, said controller being further configured to, in a guidance mode or in a verification mode, in respect of said first step:

cause said projector to illuminate said work zone using said projector pixel set for said first step to indicate, by illumination of said work zone, said at least one difference identified between said first current scene pixel map and said reference scene pixel map, said controller being further configured to, in said guidance more or in said verification mode, in respect of each subsequent step of said sequence of assembly steps:

cause said projector to illuminate said work zone using said projector pixel set for the respective subsequent step to indicate, by illumination of said work zone, said at least one difference identified between said respective current scene pixel map and said preceding scene pixel map.

8. The assembly system of claim 7, wherein said controller is configured to create said first current scene pixel map and said respective scene pixel map by causing the projector to project a light pattern with a known structure to said work zone, causing said camera to capture the projected structured light pattern, and mapping said camera pixels with said projector pixels using said light pattern structure.

9. The assembly system of claim 7, wherein said controller is configured to cause the projector to project said light pattern with a known structure to said work zone by causing said projector to project a sequence of images to said work zone.

10. The assembly system of claim 7, wherein said controller is configured to compare said first current scene pixel map with said reference scene pixel map by determining the or each difference between said first current scene pixel map and said reference scene pixel map, and to compare said respective current scene pixel map with said preceding scene pixel map by determining the or each difference between said respective current scene pixel map and said preceding scene pixel map.

11. The assembly system of claim 7, wherein said controller is configured to compare said first current scene pixel map with said reference scene pixel map by subtracting said first current scene pixel map from said reference scene pixel map, or subtracting said reference scene pixel map from said first current scene pixel map, and to compare said respective current scene pixel map with preceding scene pixel map by subtracting said respective current scene pixel map from said preceding scene pixel map, or subtracting said preceding reference scene pixel map from said respective current scene pixel map.

12. The assembly system of claim 7, wherein said controller is configured to, in said verification mode, in respect of said first step and said respective subsequent step, directly or indirectly determine a size of said projector pixel set, and to cause said projector to illuminate said work zone using said projector pixel set if said size exceeds a threshold value.

\* \* \* \* \*